United States Patent [19]

Valerio

[11] 4,108,267
[45] Aug. 22, 1978

[54] TRACTION DEVICE

[76] Inventor: Robert Michael Valerio, P.O. Box 153, 5214 Chapel Rd., North Madison, Ohio 44057

[21] Appl. No.: 752,310

[22] Filed: Dec. 20, 1976

[51] Int. Cl.$^2$ .................................................. B60G 1/00
[52] U.S. Cl. .................................... 180/71; 267/66
[58] Field of Search ............... 267/66; 280/29; 180/71

[56] References Cited

U.S. PATENT DOCUMENTS

| | | | |
|---|---|---|---|
| 3,191,711 | 6/1965 | Conner | 180/71 |
| 3,695,605 | 10/1972 | Grossi | 267/66 |
| 3,777,838 | 12/1973 | Barnes | 180/71 |
| 3,788,629 | 1/1974 | Johnson | 267/66 |
| 3,897,844 | 8/1975 | Chevalier | 180/71 |

*Primary Examiner*—Joseph F. Peters, Jr.
*Assistant Examiner*—Donn McGiehan

[57] ABSTRACT

An articulated ladder-like type traction device for selectively stabilizing the load and torque characteristics for use in the rear suspension system of a vehicle. The traction device includes a lower frame member adapted to be pivotally connected at one end to a vehicle chassis and pivotally connected at the other end to the rear axle of the vehicle. A second frame member is fixedly attached to the first member adjacent the first pivotal connection and extends at an angle in a generally vertical plane to the first mentioned frame member, and terminates in a pivotal connection to one end of a turn buckle type link arrangement. The turn buckle type link is pivotally connected at its other end to the rear wheel axle. An upstanding member fixedly connects the frame members adjacent the second pivotal connection. Adjustment of the turn buckle type link raises and lowers the first mentioned pivot, and thus raises and lowers the vehicle chassis for controlling the load over said rear axle while simultaneously controlling the torque imparted to said chassis from the vehicle engine for maximizing drive traction to said vehicle.

4 Claims, 3 Drawing Figures

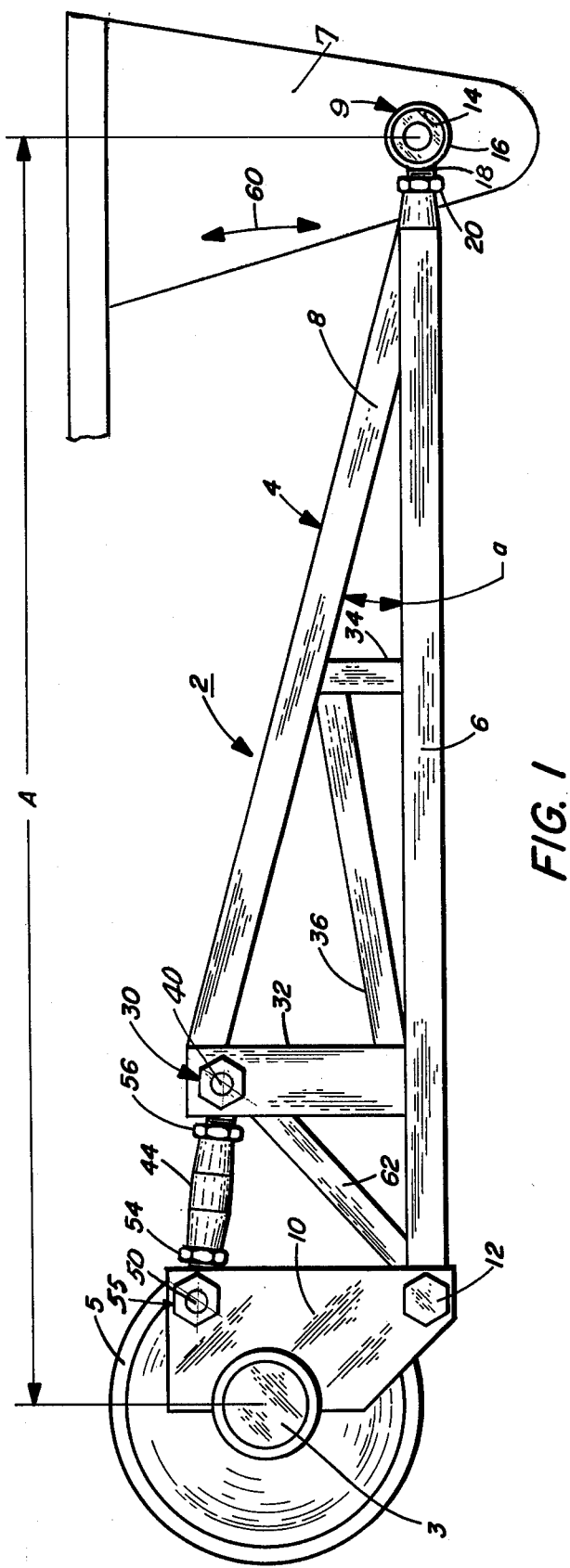
FIG. 1
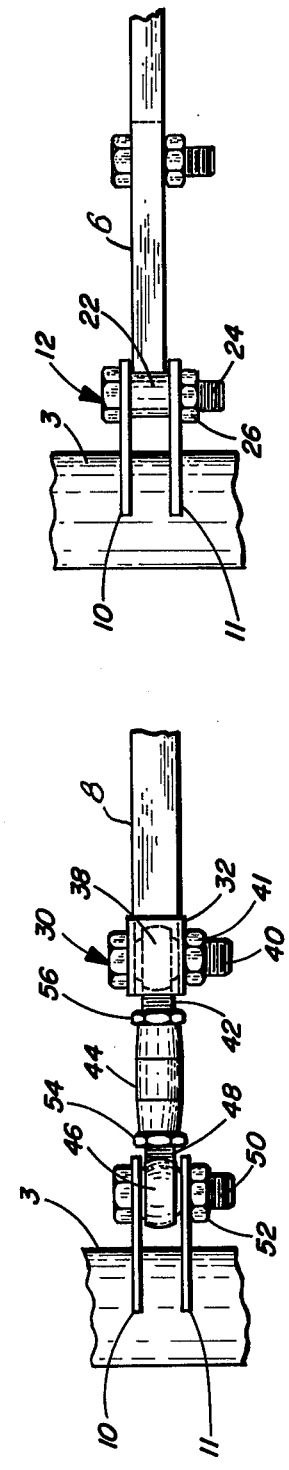
FIG. 3
FIG. 2

TRACTION DEVICE

BACKGROUND OF THE INVENTION

The present invention relates to a vehicle traction device and more particularly relates to an improved construction for an articulated linkage-type traction device for stabilizing the load and torque forces on a vehicle suspension system. The device of the present invention has particular application for such stabilizing purposes when applied to the rear suspension system of a drag-race vehicle of the type which accelerates at high speeds from an initial stop position.

Heretofore, it has been recognized that optimum speed conditions can be obtained for racing vehicles, such as drag-race cars, when a selective portion of the overall vehicle weight and, hence, the center of gravity of the vehicle can be shifted rearwardly so as to be centered over the rear drive axle so as to impart maximum traction to the rear drive wheels, thereby to provide the necessary quick-start for competitive racing, for example. Further, it has been recognized that stabilization of the rear suspension system should be maintained in order to compensate for the torque forces applied to the rear wheels, particularly the outside or right wheel, resulting from the power forces imparted to the vehicle chassis from the vehicle engine. This is particularly a problem with drag-type cars which have relatively light-weight chassis, but with relatively high horsepower engines. For example, in conventional drag-racing, the outside or right rear wheel has a tendency to lift upwardly, whereas, the inner or left rear wheel reacts oppositely, resulting from the torque forces from the engine resulting in a wobbling effect on the rear end of the car with consequent adverse affects on the speed of the vehicle, as well as to its safety performance.

SUMMARY OF THE INVENTION

The present invention provides a traction device, particularly adapted for competitive race vehicle suspension systems, such as drag-race suspension systems. In the invention, the device comprises a frame structure which is connected via a plurality of pivot points to the rear axle of the vehicle by means of a plurality of pivot points and is pivotally connected adjacent its opposite end to the vehicle chassis. The rear pivotal connection includes a selectively adjustable pivot linkage, whereas the forward-most pivotal connection to the vehicle chassis maintains a predetermined axial distance A between the front and rear mountings of the device. The selectively adjustable linkage arrangement is operatively coactive to raise or lower the vehicle chassis so as to shift the weight, and, hence, the center of gravity, of the vehicle rearwardly over and in centered relation in respect to the rear axle of the vehicle axis so as to maximize the loading of the vehicle axis over the longitudinal axis of the rear axle for maximum traction to the rear drive wheels of the vehicle. In the invention, it is contemplated that at least two of said devices will be provided with one being adjacent each rear wheel so as to selectively accommodate the resultant torque forces from the engine so that one of the rear wheels, for example, the outermost or right rear wheel can be elevated to compensate and, hence, stabilize such resultant torque forces.

From the foregoing and accompanying description and drawings, it will be seen that the present invention provides a novel traction device which includes a selectively operable linkage arrangement for maximizing the functional characteristics of the rear suspension characteristics of a vehicle, such as a drag-race vehicle by enabling the operator to selectively distribute the load (i.e., the center of gravity) over the rear axle for maximum traction to the rear wheels while simultaneously enabling the operator to compensate for, and hence, stabilize the resultant torque forces from the engine to the rear wheels for optimum stability of the vehicle when operated under high acceleration force. In the invention, the traction device is of a simple, yet rugged construction which is easy to install. With this device, all mounting points are parallel to double housing brackets, which enables precise adjustment for proper pinion angles and forward point of the center height.

In the invention, the chassis pre-loading can be obtained by adjusting the upper link connecting bar statically load the right rear tire downward, offsetting the normal torque reaction which prevails to move upward in normal operating conditions. Thus, there is provided in the present invention the elimination for the need for special or staggered spring weights. Hence, in the present invention, there is provided a complete positive control of the rear suspension and the capability to replace conventional systems. For example, in the present invention the traction device is adaptable to leaf spring suspension, coil over suspensions and floating housing mount applications, for example.

DESCRIPTION OF THE DRAWINGS

FIG. 1 is a side elevation view of the traction device of the present invention;

FIG. 2 is a fragmentary top plan view looking downwardly on the selectively operable linkage arrangement of FIG. 1; and FIG. 3 is a fragmentary, bottom view of FIG. 1 thereof.

DESCRIPTION OF THE PREFERRED EMBODIMENTS

Referring again to the drawings, and in particular to FIG. 1 thereof, there is illustrated the traction device, designated generally at 2, of the present invention which is adapted to be mounted at one end to a vehicle chassis (not shown) and at the other end to the axle 3 which mounts the rear vehicle wheel drum 5. In the invention, it will be understood that two of such devices will be employed so as to selectively accommodate the resultant torque forces from the engine. Moreover, the following description will proceed with reference to the drawings wherein like parts are designated by like reference characters.

In the embodiment shown, the device 2 includes a frame structure, designated generally at 4, which includes a first lower, frame member 6 which is pivotally attached at one end to a first pivot connection 9 and at the opposite end to a second pivot connection 12. The pivot connection 9 includes a ball-joint connection which is fixedly attached to the frame 7 of the chassis (not shown). This includes a ball 14 which is press-fit within the joint member 16 with the member 16 being integrally attached to a threaded screw 18 which mounts a selectively adjustable nut 20. The screw 18 is threadably attached to the member 6 so that, upon adjustment of the nut 20, the member 6 can be adjusted lengthwise in an axial direction in respect to the frame of the chassis. Moreover, the pivot connection 9 provides a fixed reference point in respect to the vehicle chassis.

The opposite pivotal connection 12 includes a sleeve 22 (FIG. 3) connected onto the member 6 and which includes a screw 24 and nut 26 arrangement for securing the member 6 to a pair of oppositely disposed bracket plates 10 and 11 which, in turn, are secured to the axle 3. By this arrangement, the member 6 is free to pivot about a horizontal axis defined by the screw 24.

As best seen in FIG. 1, a second upper, frame member 8 is integrally attached at one end to the member 6 and extends angularly upwardly and is fixably connected, as at 30, at its opposite end to an upstanding frame member 32. Preferably, the members 6 and 8 are disposed at an angle (a) such as approximately 15°. To strengthen the frame construction, a second parallel support member 34 is integrally attached between the members 6 and 8 and extends parallel to the member 32. A diagonal cross-member 36 is made integral with and extends between the members 32 and 34 to strengthen the connection between the member 6 and 8.

As best seen in FIG. 2, the pivotal connection 30 includes a ball joint 38 which is pivotally connected to a screw 40 which extends between a pair of oppositely disposed members 32. The ball joint 38 is attached via an axial screw 42 to an adjustable turn buckle type link 44 which is attached via another ball joint 46 and screw 48 to the plates 10 and 11. The pivotal connection 55 includes a ball joint 46 pivotally mounted on another screw 50 which extends between plates 10 and 11 for securement by a nut 52. By this arrangement, the turn buckle type link 44 can be axially adjusted by adjustment of a pair of nuts 54 and 56 for raising and lowering the frame including frame members 6 and 8 in a vertical direction. For example, the turn buckle type link 44 may have an adjustment of approximately one inch so as to give a vertical adjustment to the vehicle chassis of approximately 4 inches as indicated by the arrow 60. To further strengthen the construction, another cross-member 62 (FIG. 1) may be provided so as to extend between the plate 10 and the member 32.

I claim:

1. A traction device for selectively stabilizing the load and torque characteristics for use in the rear suspension system of a vehicle comprising, a frame, said frame including a first frame member, pivotal connection means operably connected adjacent one end of said frame member and adapted to pivotally connect said one end of the frame member to a vehicle chassis, pivotal connection means disposed adjacent the other end of said frame member and adapted for pivotally connecting the other end of said frame member to a rear axle of a vehicle, a second frame member fixedly connected at one end to the first frame member adjacent the first mentioned pivotal connection means, pivotal connection means disposed adjacent the other end of the second frame member and spaced from said first frame member, and lengthwise adjustable link means pivotally connected at one end to said third mentioned pivotal connection means and adapted for pivotal connection at the other end to said rear vehicle axle whereby selective adjustment of said link means pivots said first frame member about the second mentioned pivot means so as to raise and lower the end of the first frame member adjacent the first mentioned pivot means.

2. A traction device in accordance with claim 1 wherein the second frame member extends at an angle in a generally vertical plane with respect to said first frame member.

3. A traction device in accordance with claim 1 wherein a generally upstanding support member connects the first frame member adjacent the said other end of the second frame member.

4. A traction device in accordance with claim 1 wherein the first frame member is axially adjustably connected to said first mentioned pivot means.

* * * * *